July 7, 1925.

J. BARLOW

HEATER

Filed Aug. 22, 1923  2 Sheets-Sheet 1

1,545,079

Witnesses:

Inventor:
Jerome Barlow
By Joshua R.H. Potts
his Attorney

July 7, 1925.  
J. BARLOW  
HEATER  
Filed Aug. 22, 1923  
1,545,079  
2 Sheets-Sheet 2

Witnesses:

Inventor:  
Jerome Barlow  
By Joshua R H Roth  
His Attorney

Patented July 7, 1925.

1,545,079

UNITED STATES PATENT OFFICE.

JEROME BARLOW, OF CHICAGO, ILLINOIS.

HEATER.

Original application filed October 28, 1922, Serial No. 597,467. Divided and this application filed August 22, 1923. Serial No. 658,701.

*To all whom it may concern:*

Be it known that I, JEROME BARLOW, a citizen of the United States, and a resident of the city of Chicago, county of Cook, and State of Illinois, have invented certain new and useful Improvements in Heaters, of which the following is a specification.

This invention relates to heaters, and has for its object the provision of a heater, particularly adapted to be connected with a heating plant of any suitable kind to serve as a substitute or auxiliary heat producing agency, together with means for directing a current of air through the heater to facilitate distribution of the heated air throughout the heating plant.

Another object of the invention is to arrange a plurality of electrical heating elements in spaced relation, and in substantial parallelism with a current of air under pressure directed therepast for effectively heating such air together with means for spreading and distributing the air over the heating elements.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical section of the invention, showing parts thereof in full lines;

Figure 1:
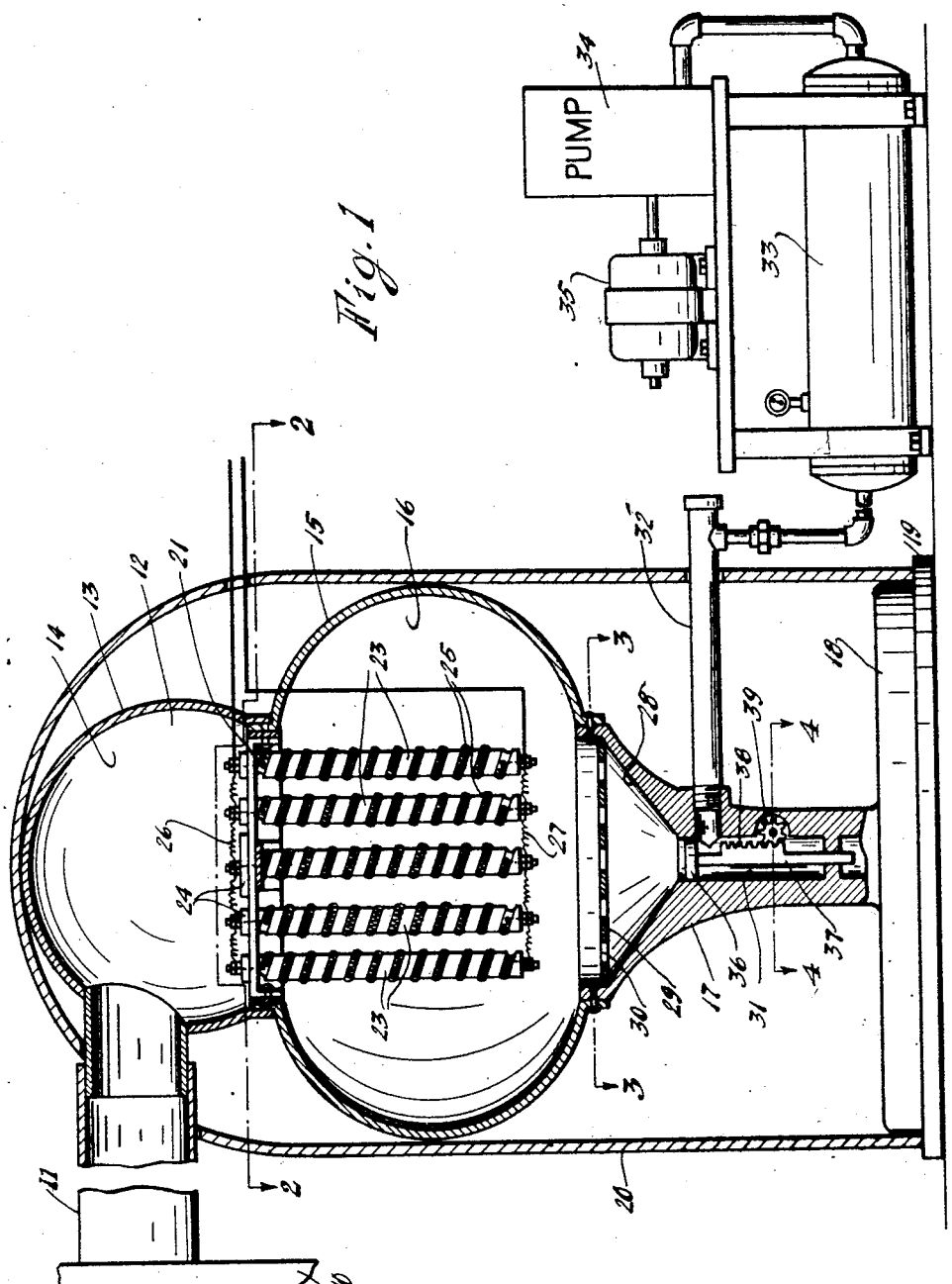
Figure 2:
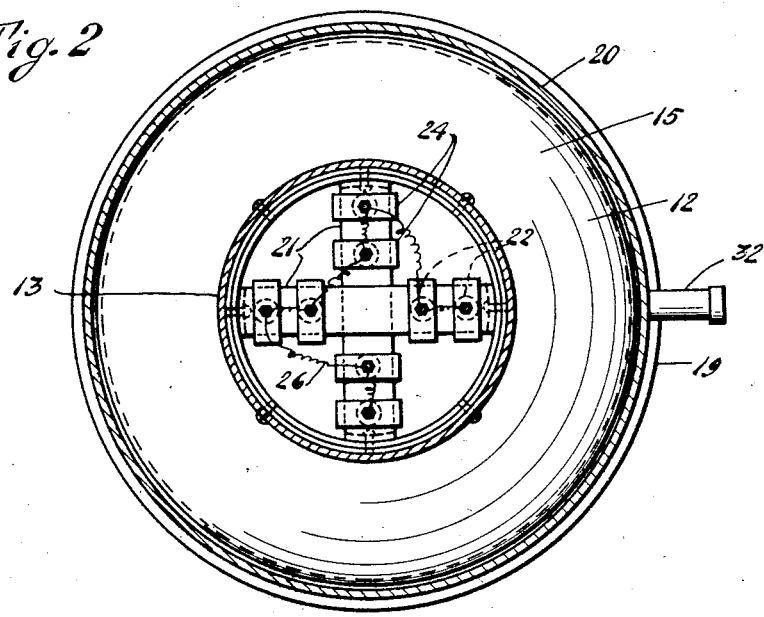
Fig. 2 is a sectional view of the invention, on the line 2—2 of Fig. 1.
Figures 3, 4:
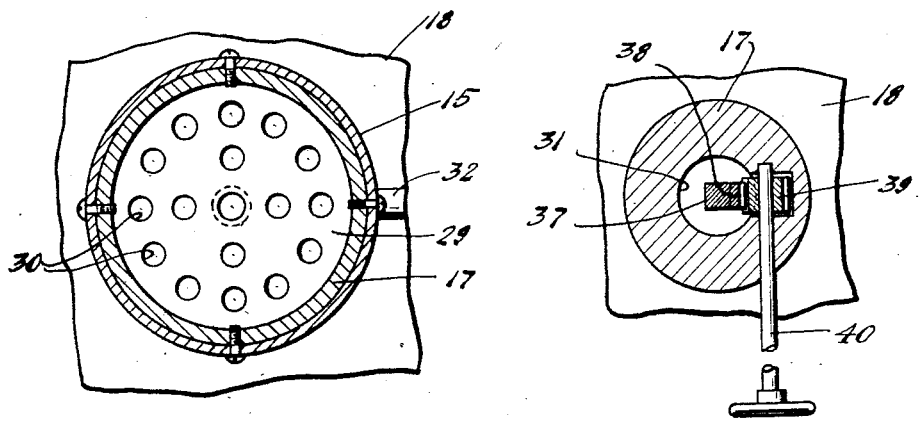
Fig. 3 is a sectional view of the invention on the line 3—3 of Fig. 1.
Fig. 4 is a sectional view of the invention on the line 4—4 of Fig. 1.

The heater contemplated herein is primarily intended as a substitute or auxiliary device adapted to be interposed in, or connected with, heat distributing systems of various types of heating plants, and may be connected with the casing of a furnace, with a single flue, if desired, or other suitable portion of the heating plant.

The present application is directed to the heater per se as contra-distinguished from the heater used in conjunction with the heat distributing system of a heating plant, which forms the subject matter of my application, Serial No. 597,467, filed October 28, 1922, of which this case is a division.

Referring to the drawings, 10 represents a fragment of a furnace casing, though it is obvious that any other suitable portion of the heat distributing system may be utilized, as above explained; 11 represents a suitable connection which communicates with the interior of a heater 12. The heater 12 preferably comprises a hood 13 having a chamber 14, such hood being preferably detachably mounted upon a somewhat larger body portion 15 having a chamber 16 therein, such body portion being mounted upon a suitable pedestal 17. The pedestal 17 is provided with a base 18 having a flange 19, adapted to support a housing 20, preferably of asbestos, which incloses the heater 12.

Mounted in the upper portion of the chamber 16 is a frame 21, which is preferably in the form of a cross. Such frame may be provided with suitable apertures 22 adapted to accommodate elongated heating elements 23, such heating elements each being provided with a flange 24, adapted to rest upon the frame 21 so as to suspend the heating elements 23 in the chamber 16 as shown. The heating elements 23 each comprises a body of insulating material having coils 25 of resistant wire thereon, said elements preferably being connected in parallel by the wires 26 and 27, such wires extending outwardly through the housing 20 and being connected with a suitable source of current (not shown).

The pedestal 17 is provided with an inverted conical chamber 28, at the mouth of which is mounted a plate 29 having a plurality of spaced perforations 30 therein. The inner end of the chamber 28 communicates with a bore 31, in the pedestal 17, and with a conduit 32, which may be connected to a compressed air tank 33 provided with a suitable pump 34 and motor 35 for driving the same. If desired, instead of the compressed air outfit, an ordinary blower fan (not shown) might be used. The bore 31 may be provided with any suitable valve for regulating the passage of air through the conduit 32 and the heater 12. As shown, a valve 36 is slidably mounted in the bore 31, such valve preferably having a stem 37 upon which is provided a rack 38 adapted to be engaged by a pinion 39, mounted upon a shaft 40 extending to the outside of the housing 20.

By this arrangement a current of air under pressure is directed through the heater, such current of air being controlled by the valve 36, and spread by the conical chamber 28 and plate 27 so as to pass between and around a plurality of spaced electrical heating elements, and being heated thereby before passage into the heat distributing system of the heating plant.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A heater of the class described comprising a circular body portion characterized by having concaved walls, an air inlet and an air outlet for said body portion, located in opposed relation at the ends of said concaved walls, and heating elements disposed in cross formation between the inlet and the outlet openings to receive directly along two fronts the air deflected from said concaved walls.

2. A heater of the class described comprising a circular body portion characterized by having concaved walls, an air inlet and air outlet for said body portion, located in opposed relation at the ends of said concaved walls, parallel heating elements disposed in cross formation between the inlet and the outlet openings to receive directly along two fronts the air deflected from said concaved walls, a conical member having its larger end in communication with said inlet opening, and means for directing a current of air into said conical member.

3. A heater of the class described comprising a circular body portion characterized by having concaved walls, an air inlet and an air outlet for said body portion, located in opposed relation at the ends of said concaved walls, parallel heating elements disposed in cross formation between the inlet and the outlet openings to receive directly along two fronts the air deflected from said concaved walls, a conical member having its larger end in communication with said inlet opening, means for directing a current of air into said conical member, and a hood having a discharging passage surrounding said air outlet.

4. A heater of the class described comprising a circular body portion having central reduced top and bottom openings and flanged, a pedestal on which the body portion is supported, secured to the bottom flange, there being a cavity in said pedestal and a flared passage leading to said bottom opening, means for forcibly introducing air into said cavity, a frame arranged within the flange around the top opening, and a plurality of heating elements arranged in cross formation depending from said frame.

5. A heater of the class described comprising a circular body portion having central reduced top and bottom openings and flanged, a pedestal on which the body portion is supported secured to the bottom flange, there being a cavity in said pedestal and a flared passage leading to said bottom opening, means for forcibly introducing air into said cavity, a valve operative in said cavity for controlling the flow of air into said passage, a frame arranged within the flange at the top opening, a plurality of heating elements arranged in cross formation depending from said frame, and a hood having a discharge conduit removably attached to the top flange.

6. A heater of the class described comprising a circular body portion having central reduced top and bottom openings and flanged, a pedestal on which the body portion is supported, secured to the bottom flange, there being a cavity in said pedestal and a flared passage leading to said bottom opening, said pedestal having a base, means for forcibly introducing air into said cavity, a frame arranged within the flange at the top opening, a plurality of heaters arranged in cross formation depending from said frame and a housing mounted on said base and enveloping said circular body portion and said pedestal.

In testimony whereof I have signed my name to this specification in the presence of two subscribing witnesses.

JEROME BARLOW.

Witnesses:
 FREDA C. APPLETON,
 MARGARET AUER.